United States Patent [19]
Gemmill

[11] 3,986,246

[45] Oct. 19, 1976

[54] DRAFT GEAR REMOVING DEVICE

[75] Inventor: Lyndon C. Gemmill, Billings, Mont.

[73] Assignee: Burlington Northern Inc., St. Paul, Minn.

[22] Filed: Mar. 12, 1975

[21] Appl. No.: 557,485

[52] U.S. Cl. .................................... 29/427; 29/252; 254/93 HP

[51] Int. Cl.² .......................................... B23P 19/02

[58] Field of Search ............. 29/427, 426, 244, 252, 29/253, 283; 254/93 HP, 93 R

[56] References Cited

UNITED STATES PATENTS

| | | | |
|---|---|---|---|
| 1,981,666 | 11/1934 | Ridley | 5/327 R |
| 2,226,201 | 12/1940 | Freyssinet | 254/93 HP |
| 3,026,541 | 3/1962 | Murat | 254/93 HP |
| 3,822,861 | 7/1974 | Scott | 254/93 HP |

FOREIGN PATENTS OR APPLICATIONS

| | | | |
|---|---|---|---|
| 1,756,286 | 3/1970 | Germany | 254/93 HP |
| 1,940,141 | 3/1971 | Germany | 254/93 HP |

*Primary Examiner*—C.W. Lanham
*Assistant Examiner*—James R. Duzan
*Attorney, Agent, or Firm*—Merchant, Gould, Smith, Edell, Welter & Schmidt

[57] ABSTRACT

A hydraulic extractor and its use in removing damaged draft gear which are wedged in railway cars. It consists of a length of pressure resistant hose folded at its center to lie flat upon itself when empty, and having connections at both ends for receiving hydraulic fluid under pressure. Also included is an arrangement for feeding the hose into the restricted space above the draft yoke and below the draft sill. That arrangement comprises a pair of strips of sheet metal of a width generally the same as that of the flat hose, and means connecting the strips together at one end. The hose is placed between the strips, with the fold near the connecting means. A rudimentary winch is provided for connection by a cable to the metal strips where they are connected. In use, the cable is fed through the space to be expanded, and connected to the winch, and the hose in its protective metal strips is winched into the desired location. When hydraulic fluid under pressure is forced into the hose at both ends, it expands laterally, driving the draft yoke and draft gear downward and out of the pocket.

9 Claims, 7 Drawing Figures

DRAFT GEAR REMOVING DEVICE

BACKGROUND OF THE INVENTION

This invention relates to the field of railroad engineering, and more particularly to an implement for use in railroad car repair shops. One of the regular tasks encountered in car repair is the replacement of damaged draft gear, and very often the damage results in the draft gear becoming wedged tightly in place. Undamaged draft gear are arranged to drop freely by gravity when appropriate retaining members are removed, but the nature of car construction is such that there is no space for the insertion of pries, jacks or other devices of mechanical advantage to assist in the removing the gear when it does not come out freely. Elaborate and time consuming torch cutting procedures are frequently resorted to which not only damage other parts of the car not related to the problem, but also must later be repaired at the cost of further expense and time.

My invention comprises a draft gear extracting arrangement which can be used in any car repair shop to extract wedged or otherwise irremovable draft gear without the need to cut away any portions of the car, and which is simple and inexpensive in construction and easy and safe to use. It includes a hydraulically expandable member or hose and insertion means including a rudimentary winch for introducing the hose while flat into the restricted space always available above a damaged draft gear, together with a source of hydraulic fluid under pressure. When hydraulic fluid is pumped into the hose, the latter expands, forcing the damaged gear out of its resting place.

Various advantages and features of novelty which characterize my invention are pointed out with particularity in the claims annexed hereto and forming part hereof. However, for a better understanding of the invention, its advantages and objects attained by its use, reference should be had to the drawing which forms a further part hereof, and to the accompanying descriptive matter, in which there is illustrated and described a preferred embodiment of the invention.

DESCRIPTION OF THE PREFERRED EMBODIMENT

Figure 2:
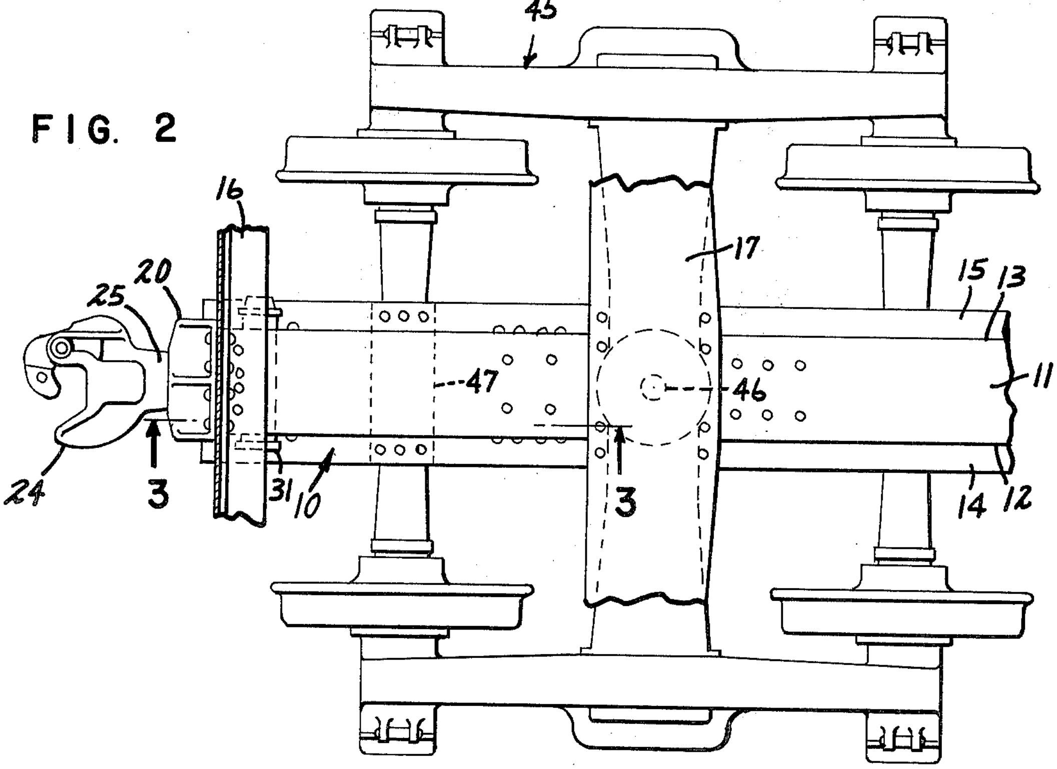
FIG. 2 is a plan view of one end of a railroad car underpinning showing the general field in which my invention is used.
Figure 3:
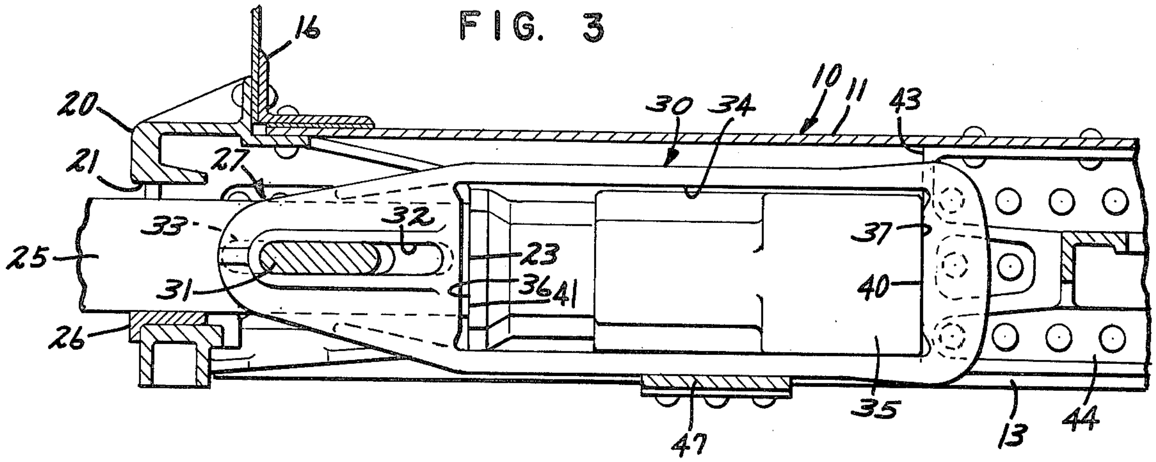
FIG. 3 is a fragmentary sectional view generally along the line 3—3 of FIG. 2 to further clarify the situs in which my invention is used.

The construction of a railroad car in the neighborhood of the draft gear is shown in FIGS. 2 and 3. A draft sill 10 extends below the center of the car for its full length, and is of inverted U-shape in section, having a top 11, a pair of sides 12 and 13, and a pair of flanges 14 and 15. Cross members such as members 16 and 17 are riveted to the top of the draft sill for supporting the car body. A steel strike casting 20 is inserted in the end of draft sill 20, and is configured to have an opening 21 and a pair of inwardly directed vertical draft lugs 22 and 23. The coupler includes a shank 25 which projects through the strike casting, resting on a sill plate 26, and into an opening 27 formed at one end of a draft yoke 30.

A cross key 31 fits loosely in a horizontal slot in coupler shank 25 and passes through aligned but longer horizontal slots 32 and 33 in the draft yoke 30 and in sill walls 12 and 13, respectively. Yoke 30 has a large aperture 34 to contain the draft gear 35, which for the present purposes may be considered to be simply a shock absorber carried in yoke 30 and projecting beyond it on either side. When the car is being accelerated, one end 36 of draft gear 35 engages draft lugs 22 and 23, and the other end 37 engages yoke 30 at 40. When the car is being backed, end 36 of draft gear 35 engages the end of coupler shank 25 at 41, and end 37 engages a further pair of draft lugs 42 and 43 comprising portions of a complex steel casting 44, riveted into sill 10, to which the truct 45 of the car is pivoted at 46. It is not uncommon to use somewhat shorter draft gear and interpose spacer plates between it and the inner surfaces of opening 34.

Normal draft gear replacement or repair calls for removal of cross key 31 and coupler 25: then when a carrier iron 47 is removed, the draft yoke 30 with the draft gear 35 within it may be lowered out of the sill "pocket" for servicing or replacement. The merciless pounding given to draft gear not only in coupling and uncoupling cars but also in over-the-road operation, frequently results in the draft gear being split or otherwise enlarged so that portions of it engage the draft sill, preventing the yoke and draft gear from moving downward when carrier iron 47 is removed. My invention is designed to apply force between the top of yoke 30 and the top 11 of draft sill 10 above it, to force the yoke out of the sill.

Figure 1:
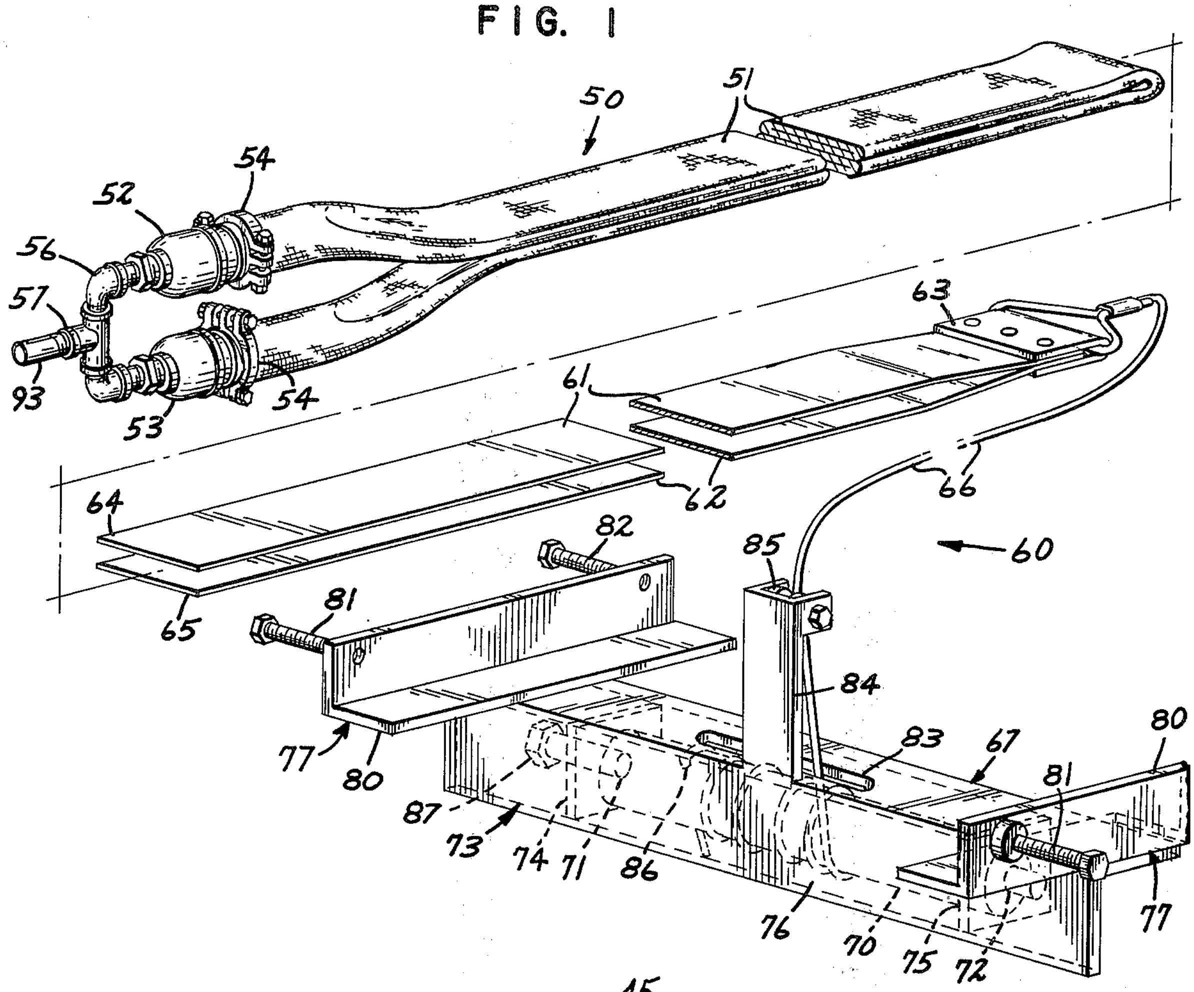
FIG. 1 is a perspective view showing the elements making up my invention by themselves.

Turning now to FIG. 1, my invention comprises a pliable tubular member 50 and insertion means 60. Member 50 may conveniently comprise a length of high pressure hose 51 having connections 52 and 53 at its ends to which it is secured by suitable hose clamps 54. To obtain maximum spacial displacement, the hose 51 is folded on itself at 55. A suitable Y-connection 56 of conventional plumbing fittings is arranged for connection at an inlet 57 to a source of hydraulic fluid under pressure.

Insertion means 60 comprises a pair of strips 61 and 62 of abrasion resistant material such as sheet metal which is fairly rigid without being wholly inflexible. Strips 61 and 62 are joined together at first ends by a connecting means 63: the other ends 64 and 65 of the strips are free. Connecting means 63 is arranged to be connected with a filar member or cable 66 by which traction may be applied to the device to move it generally in the direction of its own longitudinal axis.

Also a part of insertion means 60 is a rudimentary winch 67 comprising a drum 70 pivotally mounted at 71, 72 in a frame 73 of any suitable construction which, for example, comprise a pair of pivot bearing plates 74 and 75 welded into an angle iron 76, to which is also welded a clamping arrangement 77 including angle irons 80 and a pair of attaching bolts 81 and 82. One leg of angle iron 76 is slotted as at 83, and an arm 84 is arranged to project outwardly at the location of slot 83 to carry a pulley 85. Drum 70 is cross bored at 86: when the free end of cable 66 is fed downward through slot 83 and passed through cross bore 86, rotation of the drum causes the cable to be wound therearound. Drum 70 is extended to include, or is provided with, a hexagonal drive member 87 by which rotation of the drum may be manually accomplished using a ratchet wrench or other suitable instrument.

Figure 7:
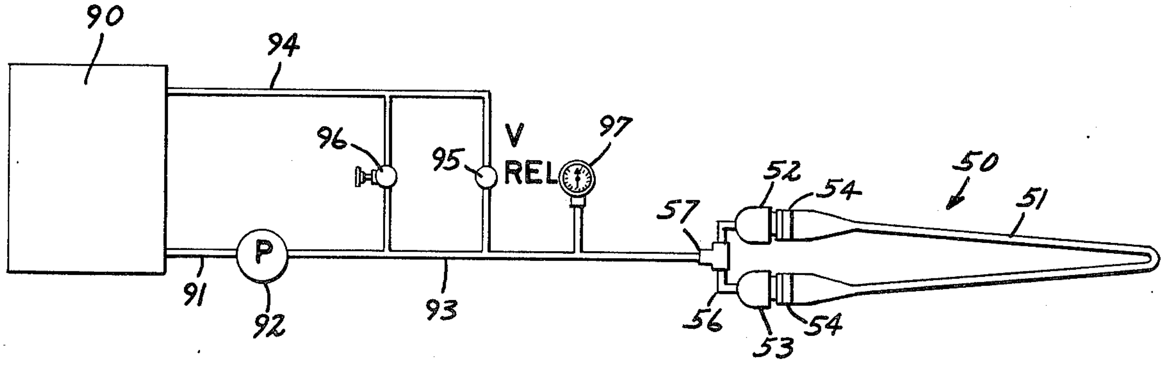
FIG. 7 is a schematic showing of my invention connected with a suitable source of hydraulic fluid under pressure.

FIG. 7 shows the simple hydraulic system needed for use of my invention. A reservoir 90 of hydraulic fluid is connected by a conduit 91 to the input of an electric or manual pump 92, the output of which is connected by a conduit 93 to connection 57 of my tubular member 50. A return conduit 94 is also provided, and is connected to conduit 93 by a pressure relief valve 95 and by a normally closed manual valve 96 which may be opened to release pressure in conduit 93: for convenience a pressure gauge 97 may be included in the system. I have found it convenient to mount elements 90-97 on a cart or skid, not shown, so that they may be brought to the vicinity of any car being worked on. If pump 92 is mnaually operable, the entire system is self-contained and can be used wherever the cart can be taken.

Figure 6:
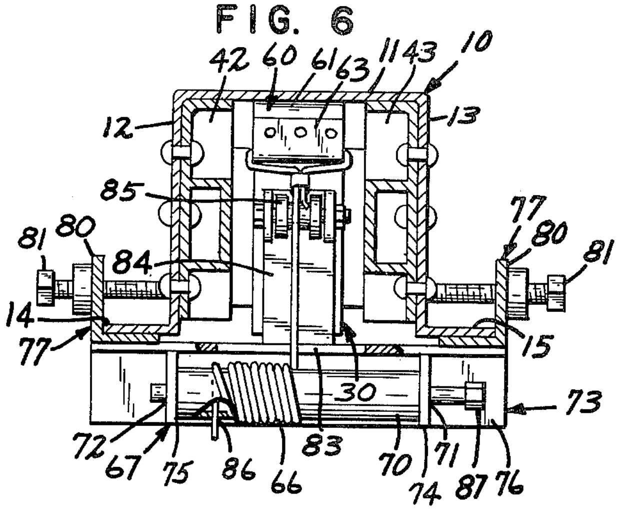
FIG. 6 is a fragmentary transverse sectional view along the line 6—6 of FIG. 5.
Figure 4:
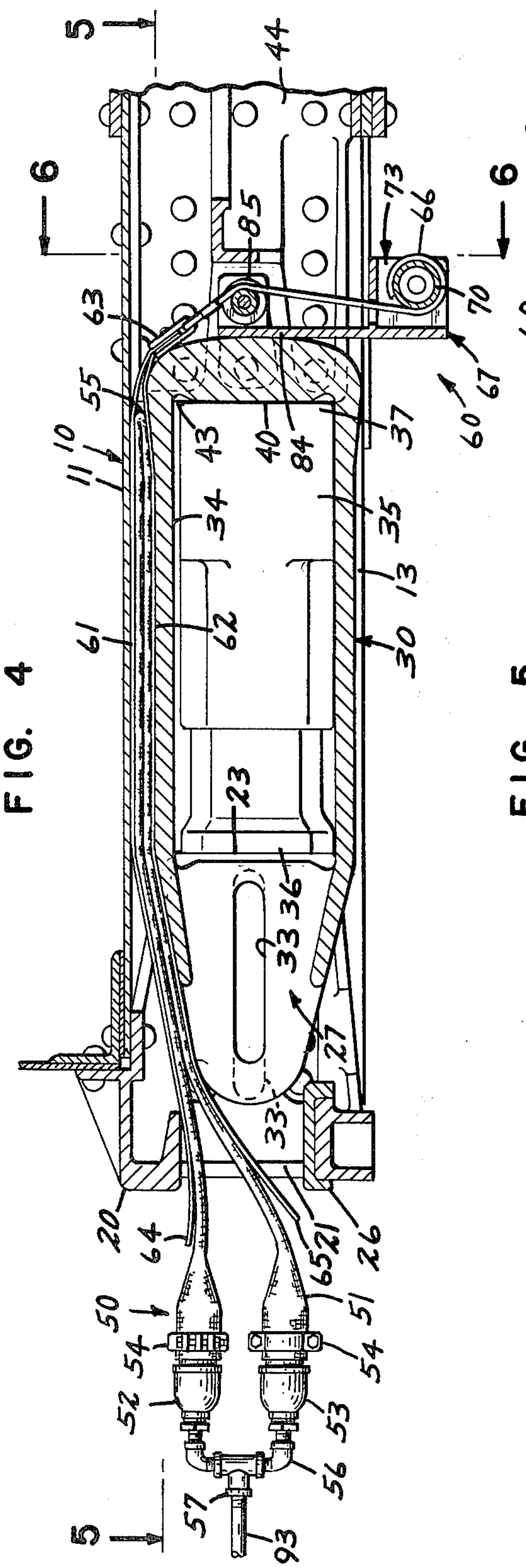
FIG. 4 is a view generally like FIG. 3 but showing my invention being introduced.
Figure 5:
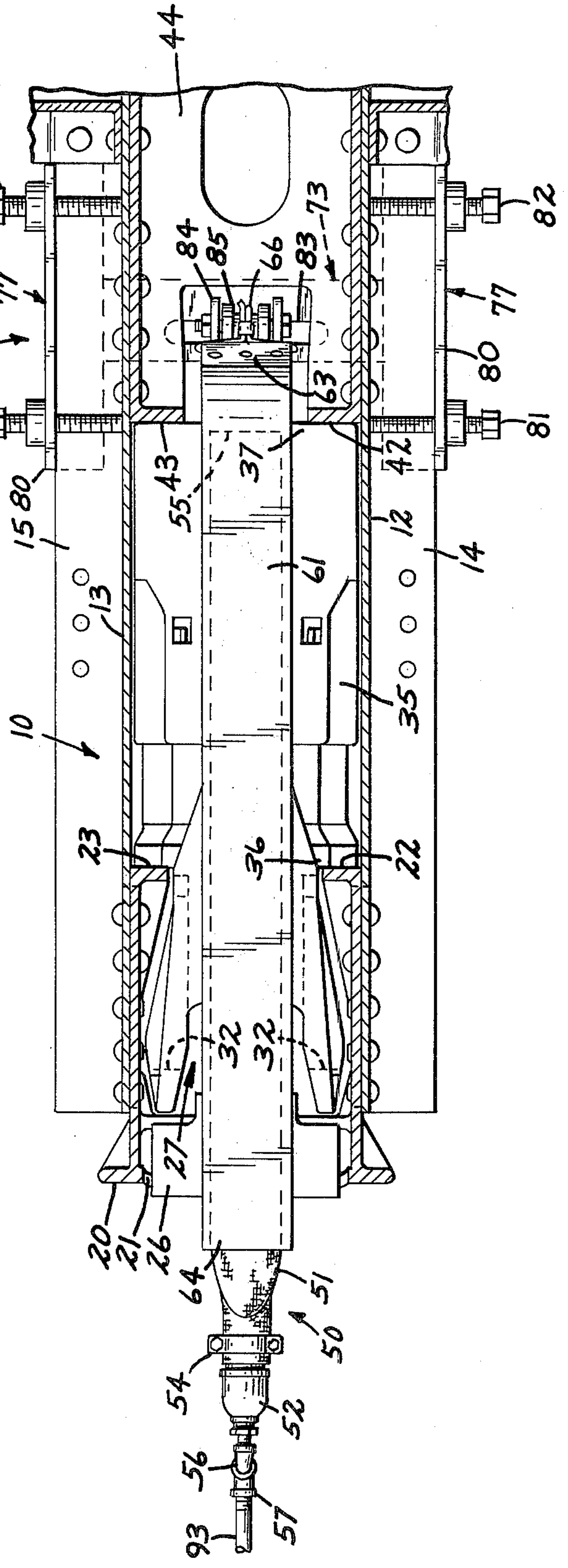
FIG. 5 is a fragmentary horizontal sectional view along the line 5—5 of FIG. 4.

FIGS. 4-6 show my invention in use. Cable 66 is unwound from drum 70 and pulled loose. The free end of the cable is fed through the opening 21 in strike casting 20, over the top of yoke 30, and down behind the yoke. Hose 51 is inserted, folded, between strips 64 and 65 of insertion means 60, the fold being next to connecting means 63. Winch 67 is temporarily secured under the flanges 14, 15 of sill 10 with arm 84 projecting upwardly to bear against the rear curve of the yoke, cable 66 is passed over pulley 85 and through slot 83 and cross bore 86. Now, but rotating drum 70, the cable can be wound on it, drawing the insertion device into the space above yoke 30 and between the yoke and the top portion 11 of the draft sill. The process is continued until the condition shown in FIGS. 4 and 5 is reached: it is not necessary thereafter to maintain tension on cable 66. Conduit 93 is coupled to inlet 57. Now, when hydraulic fluid under pressure is supplied at inlet 57, each layer of hose 50 expands toward a circular cross section. This applies tremendous force between the draft sill portion 11 and the top of yoke 30, and the latter is forced downward, carrying the damaged draft gear 35 with it. The amount of expansion of the doubled hose is usually sufficient to perform the extraction in one operation: if more displacement is needed, the insertion device is depressurized, a timber or other spacer of the proper thickness is placed on top of yoke 30, and the process is repeated until the draft gear is forced from the draft sill, and may be removed with the yoke containing it.

From the above, it will be apparent that I have invented a new and useful implement for extracting damaged draft gear from railroad cars. The implement is easily and cheaply constructed, from equipment generally available in car repair shops, and is quickly and conveniently used to perform a task heretofore performed only by laborious and indirect procedures which, moreover, damaged portions of the cars.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size and arrangement of parts, within the principle of the invention, to the full extent indicated by the broad general meaning of the terms in which the appended claims are expressed.

What is claimed is:

1. A method of extracting damaged draft gear from a railroad car from which the coupler, cross key, and carrier iron have been removed which comprises the steps of:

a. positioning an empty pliable tubular member between insertion means comprising a pair of overlying strips of abrasion resistant material connected together at first ends, said overlying strips engaging the tubular member only frictionally;

b. pulling on the connection between said strips to draw the insertion means and hence the tubular member endwise into and substantially through the restricted space between the draft yoke and the draft sill thereabove; and c. supplying fluid under pressure to said tubular member to cause it to expand laterally, applying force from said strips to displace the yoke and gear downwardly.

2. The method of claim 1 in which the tubular member is folded on itself, and positioned in the insertion means so that the fold enters the restricted space first.

3. The method of claim 1 which includes the preliminary steps of:

a. feeding one end of a filar member, in a direction toward the center of the car, through the space into which the insertion means is to be introduced, the other end of said filar member being attached to the insertion means at the connected ends thereof, and b. using the filar member to winch the insertion means into the restricted space.

4. Apparatus for removing damaged draft gear from a railroad car comprising, in combination:

a pliable tubular member of pressure resistant material;

insertion means for drawing the member while flat into the restricted space above the yoke of the draft gear to be removed, said means comprising two overlying substantially flat strips of abrasion resistant material, the width of said strips beging generally that of the tubular member when flat, and connecting means for joining together first ends of the two strips, the other ends being free, so that when the tubular member is inserted between the strips, the inner faces of the strips frictionally engage outer surfaces of the tubular member; and means for conducting fluid under pressure to the member so that its resulting expansion may force the yoke and draft gear downwardly.

5. Apparatus according to claim 4, together with traction means including:

a filar member attached to the connecting means of the insertion means;

a winch comprising a drum, means for connecting the filar member to the drum for coiling therearound, a frame, and means for mounting the drum for rotation in the frame;

means for securing the frame to the bottom of a draft sill at the location of a draft gear to be extracted;

an arm projecting upwardly from the frame to bear laterally against the end of the draft yoke when the frame is so secured;

and a pulley carried by the arm to lead the filar member from the insertion means to the drum of the winch.

6. Apparatus according to claim 4 in which the tubular member is folded on itself and is inserted into the restricted space fold first, and in which the fluid is conducted to both ends of the tubular member.

7. Apparatus according to claim 4 in which the tubular member is folded on itself and is positioned in the insertion means with the fold adjacent the connecting means thereof, and in which the fluid is conducted to both ends of the tubular member.

8. Apparatus according to claim 4 together with a source of hydraulic fluid and means supplying fluid from said source under pressure to the tubular member.

9. Apparatus according to claim 4 in which abrasion resistant material is sheet metal.

* * * * *